(12) United States Patent
Sugawara

(10) Patent No.: US 6,531,840 B2
(45) Date of Patent: Mar. 11, 2003

(54) POWER WINDOW APPARATUS PROVIDED WITH CONTROL PART FOR DETECTING PINCHING AND METHOD FOR CONTROLLING THE SAME

(75) Inventor: Takehito Sugawara, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/911,022

(22) Filed: Jul. 23, 2001

(65) Prior Publication Data

US 2002/0014871 A1 Feb. 7, 2002

(30) Foreign Application Priority Data

Jul. 28, 2000 (JP) .......................... 2000-233173

(51) Int. Cl.⁷ ................................................ H02P 1/00

(52) U.S. Cl. ...................... 318/445; 318/466; 318/468; 318/265; 318/266; 49/26; 49/28

(58) Field of Search ................................ 318/265, 266, 318/286, 445, 466, 468; 49/26, 28

(56) References Cited

U.S. PATENT DOCUMENTS

| | | | | |
|---|---|---|---|---|
| 5,004,961 A | * | 4/1991 | Berner et al. | .............. 318/65 |
| 5,399,950 A | | 3/1995 | Lu et al. | .............. 318/565 |
| 5,729,104 A | * | 3/1998 | Kamishima et al. | ........ 318/446 |
| 6,034,497 A | | 3/2000 | Tamagawa et al. | ........ 318/466 |
| 6,297,609 B1 | * | 10/2001 | Takahashi et al. | .......... 318/484 |

* cited by examiner

*Primary Examiner*—Robert E. Nappi
*Assistant Examiner*—Rina I. Duda
(74) *Attorney, Agent, or Firm*—Brinks Hofer Gilson & Lione

(57) ABSTRACT

A power window apparatus and a method for controlling the same is provided in which the whole travel region of a window is divided into a plurality of blocks, a reference value of a motor torque value, a tolerance value for tolerating a fluctuation in the motor torque value, and a determination value obtained by adding the reference value and the tolerance value for determining pinching are set and stored for each block and, when the torque value detected is larger than the reference value, a correction value in proportion to the difference is added to the determination value so as to perform the next determination.

6 Claims, 6 Drawing Sheets

FIG. 6

$$M = \{(kt \cdot \frac{Vb}{Rm}) - Tm\} - \frac{Ke \cdot Kt}{Rm \cdot Pw}$$

WHERE, M : MOTOR TORQUE VALUE

Vb : BATTERY VOLTAGE kt : MOTOR TORQUE COEFFICIENT

Rm : MOTOR WIRE WOUND RESISTANCE ke : MOTOR GENERATION COEFFICIENT

Pw : INTERVAL BETWEEN PULSES GENERATED FOR ONE ROTATION OF MOTOR

Tm : MOTOR INTERNAL TORQUE

POWER WINDOW APPARATUS PROVIDED WITH CONTROL PART FOR DETECTING PINCHING AND METHOD FOR CONTROLLING THE SAME

BACKGROUND OF THE INVENTION

1. Field of the Invention

The present invention relates to a power window apparatus of an automobile and a method for controlling the same, more specifically, to a power window apparatus provided with a control part for detecting pinching when a foreign matter is pinched in a window so as to stop or operate the opening and closing operation of the window in reverse and a method for controlling the same.

2. Description of the Prior Art

There has been proposed a power window apparatus for use in an automobile which opens and closes a window by its driving part. The power window apparatus is provided with a control part. When a foreign matter is pinched in a window at the time of opening and closing the window, the control part determines whether there is pinching in the window to prevent an excessive load from being applied to the driving part and to protect the pinched matter. In the event that there is pinching, the control part immediately stops or operates the driving part in reverse.

Such a prior art power window apparatus, as shown in the construction of FIG. 5, has a driving part capable of being operated in forward or reverse for opening and closing a window (hereinafter referred to as a "motor") 41, a power supply part 42 for supplying power to the motor 41, an operation switch part 43 having a plurality of switches and outputting a voltage as a signal for opening and closing the window by manual operation, a control part 44 (hereinafter referred to as a "CPU") for controlling the rotation of the motor 41 through the motor power supply part 42 corresponding to the operation of the operation switch part 43, and a pulse generation part 45 for generating a pulse corresponding to the rotation of the motor 41.

When any one of the switches (43a, 43b, 43c and 43d) of the operation switch part 43 is operated, a signal corresponding to the switch operated is inputted to the input terminals (P02, P03 and P04) of the CPU 44. The CPU 44 outputs a signal from the output terminals (P05 and P06) to the power supply part 42 in accordance with the signal inputted. The motor power supply part 42 supplies power to the motor 41 corresponding to the signal inputted. The motor 41 is rotated in forward/reverse so as to open/close the window.

FIG. 2 is a characteristic diagram showing one example of the number of pulses generated, a reference value of a motor torque value, a tolerance value for tolerating the fluctuation in the motor torque value, and a determination value provided by adding the reference value and the tolerance value for determining pinching, which are set for each block when the whole travel region of the window is divided into 36 blocks in the power window apparatus. The vertical axis shows the torque value outputted by the motor 41 (kg·f), and the horizontal axis shows the number of pulses generated by the pulse generation part 45 (the left end shows the window full-open position and the right end shows the window full-close position). The respective set values are set previously and stored in a storing part 44b in the CPU 44.

In the construction described above, when the motor 41 is rotated, the pulse generation part 45 is interlocked with the rotation of the motor 41 to generate a pulse, and outputs the pulse to the input terminal P07 of the CPU 44.

At this time, the CPU 44 measures the time required for the interval between the inputted pulses generated, detects a motor torque value based on the time measured, counts the number of the inputted pulses generated, and from the number of the pulses generated, determines in what block the window is positioned.

The CPU 44 compares the determination value in the block stored in the storing part 44b and determined with the motor torque value detected. When the motor torque value is larger than the determination value, the CPU 44 determines that a foreign matter is pinched in the window to stop or reverse the motor 41.

Such a power window apparatus sets the determination value for each block. The region required for the storing part 44b in the CPU 44 is 1/32 times smaller than that when the determination value is set for each pulse. There occur a fluctuation in the motor torque value or a fluctuation in the coefficient of friction between the window and the window frame due to temperature changes, and an irregular variation in the pulse outputted owing to the shaved gear teeth of the pulse generation part 45 due to changes over time, so that the motor torque value detected is varied in the same block each time a pulse is generated. In some cases, the variation in the motor torque value may exceed the tolerance value. In addition, the power window apparatus may determine that there is pinching when the pinching does not occur, so as to cause malfunction to stop or reverse the operation of the window.

SUMMARY OF THE INVENTION

The present invention solves this problem, and an object of the present invention is to provide a power window apparatus and a method for controlling the same, which are less likely to cause malfunction to determine that there is pinching when the pinching does not occur, thereby stopping or reversing the operation of the window in the event that a motor torque value is fluctuated in the small storing part due to temperature changes or changes over time.

To solve the foregoing problem, a power window apparatus of the present invention comprises a driving part for opening and closing the window of an automobile, a pulse generation part for generating a pulse corresponding to the operation of the driving part, torque value detection means for detecting a torque value outputted by the driving part, torque value storing means for storing a reference value of torque and a first determination value larger than the reference value for each block of a plurality of blocks dividing the whole travel range of the window, and a control part for comparing the torque value detected during the operation of the driving part with a first determination value of the block in which the window is positioned at that time each time the pulse is generated, so as to determine pinching when the torque value is larger than the first determination value and to stop or operate the driving part in reverse, wherein the control part, only when the torque value is larger than a reference value of the block in which the window is positioned, adds a correction value in proportion to a difference between the torque value and the reference value to the first determination value so as to provide a second determination value, thereby, at the time of the next detection of the torque value, determining pinching when the torque value in generating the pulse is larger than the second determination value.

According to the present invention, when the torque value detected is varied due to temperature changes or changes over time, a value in proportion to the variation is added to the determination value at the time of the next detection for determination. It is possible to provide a power window apparatus which is less likely to cause malfunction to determine that pinching occurs when the pinching does not occur, thereby stopping or reversing the operation of the window.

According to the present invention, a method for controlling a power window apparatus comprises the steps of: storing a reference value of torque outputted by a driving part for opening and closing the window and a first determination value larger than the reference value for each block of a plurality of blocks dividing the whole travel range of the window of an automobile; detecting a torque value each time the window travels a predetermined distance in the block; comparing the torque value with a first determination value of the block in which the window is positioned at that time; determining pinching when the torque value is larger than the first determination value; and outputting a control signal for stopping or operating the window in reverse, the method further comprises the steps of: obtaining a difference between the torque value and the reference value of the block in which the window is positioned; and adding a correction value in proportion to the difference to the first determination value of the block in which the window is positioned only when the difference is positive to obtain a second determination value, thereby, at the time of the next detection of the torque value, determining pinching when the torque value is larger than the second determination value.

The present invention can provide a method for controlling a power window apparatus which is less likely to cause malfunction, as described above.

According to the present invention, the correction value does not exceed a predetermined value.

According to the present invention, the correction value does not exceed a predetermined value. Thus, when the torque value detected is increased gradually, the determination value is not increased endlessly. When pinching occurs, the pinching can be determined correctly.

According to the present invention, the correction value is 25% of the difference, and the predetermined value is 25% of a difference between the first determination value and the reference value of the block.

According to the present invention, the correction value is 25% of the difference, and the predetermined value is 25% of a difference between the first determination value and the reference value of the block in which the window is positioned. Thus, the control part facilitates calculation so as to perform calculation fast, or it is possible to use the control part which is inexpensive although the calculation performance is poor.

BRIEF DESCRIPTION OF THE DRAWINGS

FIG. 6 is a diagram showing an equation for determining a motor torque value of the power window apparatus of the present invention and the prior art.

DESCRIPTION OF THE PREFERRED EMBODIMENTS

Embodiments of the power window apparatus and the method for controlling the same according to the present invention will be described hereinbelow with reference to FIGS. 1 to 4 and FIG. 6.

Figure 1:
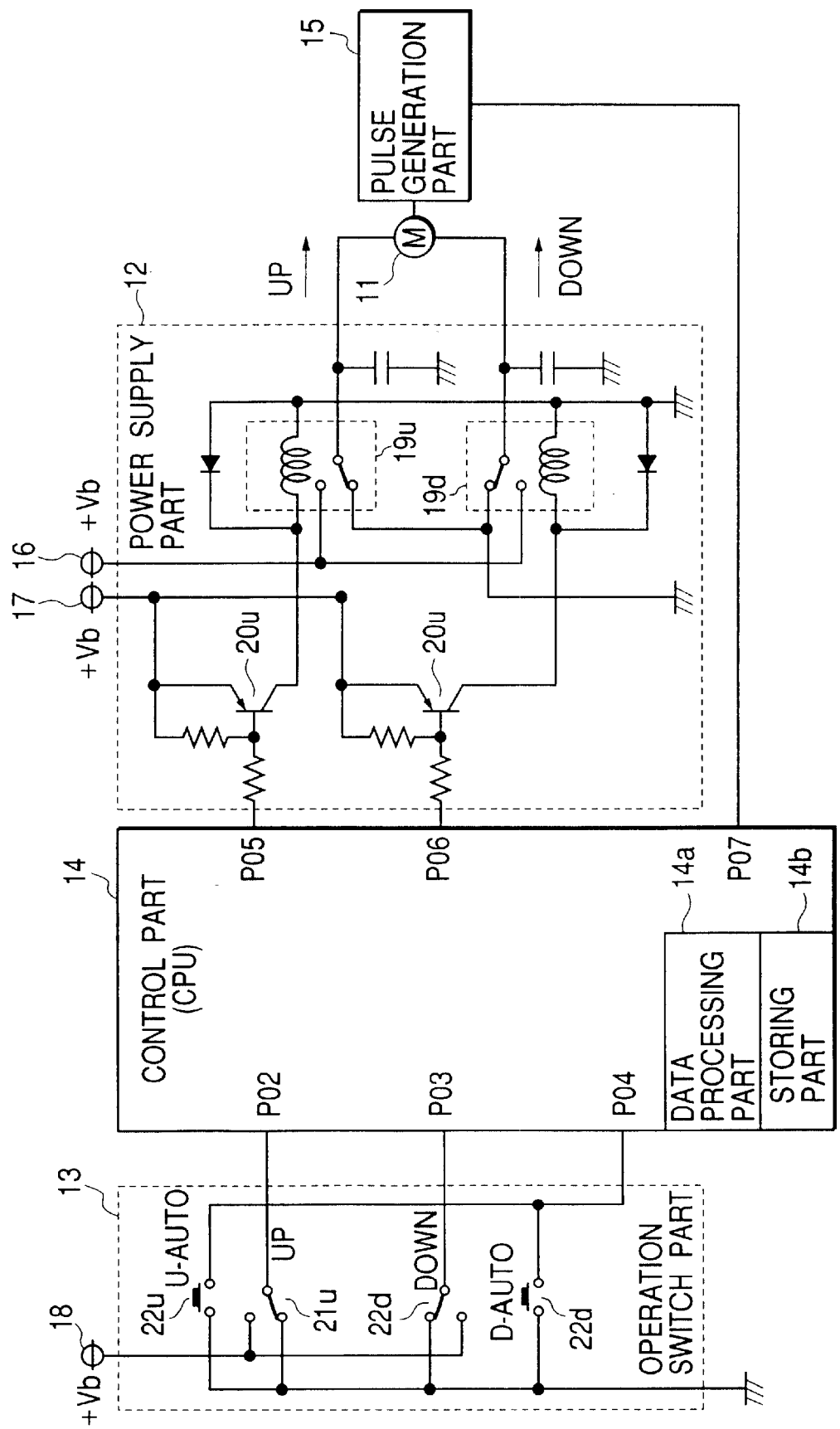
FIG. 1 is a diagram showing the construction of an embodiment of a power window apparatus of the present invention.

FIG. 1 is a diagram showing the construction of an embodiment of the power window apparatus according to the present invention. The power window apparatus of the present invention has a driving part (hereinafter referred to as a "motor") 11, a power supply part 12 to the motor, an operation switch part 13, a control part (hereinafter referred to as a "CPU") 14, a pulse generation part 15, and vehicle-mounted power terminals 16, 17 and 18.

The motor 11 is a motor capable of being rotated in forward or reverse for opening and closing the window of an automobile. In the circuit shown in FIG. 1, when an electric current flows from the upside to the downside (UP), the motor is rotated so as to close the window. When an electric current flows from the downside to the upside (DOWN), the motor is rotated so as to open the window.

The power supply part 12 is a circuit for supplying power from the vehicle-mounted power terminal 16 to the motor 11, and has relays 19u, 19d, and switch transistors 20u, 20d. In the relays 19u, 19d, the moving contacts are respectively connected to different terminals of the motor 11, and one of the fixing contacts is connected to the vehicle-mounted power terminal 16 while the other fixing contact is connected to the ground. Each of the moving contacts is usually connected to the fixing contact of the ground side, but is connected to the fixing contact of the vehicle-mounted power terminal 16 side when a control current flows to the coil of the relays 19u, 19d.

In the transistor 20u, the base is connected to the output terminal P05 of the CPU 14, the collector is grounded through the coil of the relay 19u, and the emitter is connected to the vehicle-mounted power terminal 17. In the transistor 20d, the base is connected to the output terminal P06 of the CPU 14, the collector is grounded through the coil of the relay 19d, and the emitter is connected to the vehicle-mounted power terminal 17.

The operation switch part 13 has a manual window closing switch (UP) 21u, a manual window opening switch (Down) 21d, an auto window closing switch (U-AUTO) 22u, and an auto window opening switch (D-AUTO) 22d.

In the manual window closing switch 21u, the moving contact is connected through the inverter to the input terminal P02 of the CPU 14, and one of the fixing contacts is connected to the vehicle-mounted power terminal 18 while the other fixing contact is connected to the ground. In the manual window opening switch 21d, the moving contact is connected through the inverter to the input terminal P03 of the CPU 14, and one of the fixing contacts is connected to the vehicle-mounted power terminal 18 while the other fixing contact is connected to the ground.

Each of the auto window closing switch 22u and the auto window opening switch 22d has one end being grounded and the other end being connected to the input terminal P04 of the CPU 14.

The CPU 14 has a plurality of input and output terminals. The input terminals (P02, P03 and P04) are applied a voltage as a signal from the operation switch part 13, and the output terminals (P05 and P06) output a voltage as a signal for turning on/off the transistors to the bases of the transistor 20u, 20d. The input terminal P07 is connected to the pulse generation part 15, and a pulse generated by the pulse generation part 15 is inputted. The CPU 14 has in its interior a data processing part 14a and a storing part 14b.

The pulse generation part 15 is interlocked with the rotation of the motor 11 using, e.g., the gear teeth mounted on the rotation shaft of the motor 11. For example, the pulse generation part 15 generates one pulse for one rotation of the motor 11, and outputs the pulse to the CPU 14.

The vehicle-mounted power terminals 16, 17 and 18 are respectively connected to the positive electrode (+Vb) of the vehicle-mounted power, and supply the vehicle-mounted power to the respective parts.

In the construction described above, when the manual window closing switch 21u is operated so as to bring the moving contact to the vehicle-mounted power terminal 18 side, the voltage from the vehicle-mounted power terminal 18 becomes a signal to be inputted through the manual window closing switch 21u and the inverter to the input terminal P02 of the CPU 14. The CPU 14 outputs a signal for turning on the transistor 20u from the output terminal P05. The transistor 20u is then turned on so that the electric current from the vehicle-mounted power terminal 17 flows through the emitter and collector to the coil of relay 19u. The moving contact of the relay 19u is switched to the vehicle-mounted power terminal 16 side. The voltage from the vehicle-mounted power terminal 16 is applied to the motor 11 so as to close the window, whereby the window is closed.

When the auto window closing switch 22u is operated, a ground voltage becomes a signal to be inputted to the input terminal P04 of the CPU 14. At this time, when the operation of the manual window closing switch 21u is stopped, the CPU 14 keeps outputting a signal for turning on the transistor 20u from the output terminal P05, so that the window remains closed until another switch is operated or the window is fully closed.

When the auto window closing switch 22u is not operated to stop the operation of the manual window closing switch 21u, the moving contact is moved away from the vehicle-mounted power terminal 18, a ground voltage is inputted through the inverter to the input terminal P02 of the CPU 14. The CPU 14 outputs a signal for turning off the transistor 20u to the output terminal P05. The transistor 20u is then turned off, so that a control electric current does not flow to the coil of the relay 19u. The moving contact of the relay 19u is switched to the ground side, whereby a voltage is not applied to the motor 11. Thus, the rotation of the motor 11 is stopped to stop the window.

Similarly, when the manual window opening switch 21d is operated so as to bring the moving contact to the vehicle-mounted power terminal 18 side, the voltage from the vehicle-mounted power terminal 18 becomes a signal to be inputted through the manual window opening switch 21d and the inverter to the input terminal P03 of the CPU 14. The CPU 14 outputs a signal for turning on the transistor 20d from the output terminal P06. The transistor 20d is then turned on so that the electric current from the vehicle-mounted power terminal 17 flows through the emitter and collector to the coil of relay 19u. The moving contact of the relay 19d is switched to the vehicle-mounted power terminal 16 side. The voltage from the vehicle-mounted power terminal 16 is applied to the motor 11 so as to open the window, whereby the window is opened.

When the auto window opening switch 22d is operated, a ground voltage becomes a signal to be inputted to the input terminal P05 of the CPU 14. At this time, when the operation of the manual window opening switch 21d is stopped, the CPU 14 keeps outputting a signal for turning on the transistor 20d from the output terminal P06, so that the window remains opened until another switch is operated or the window is fully opened.

When the auto window opening switch 22d is not operated to stop the operation of the manual window opening switch 21d, the moving contact is moved away from the vehicle-mounted power terminal 18, a ground voltage is inputted through the inverter to the input terminal P03 of the CPU 14. The CPU 14 outputs a signal for turning off the transistor 20d to the output terminal P06. The transistor 20d is then turned off, so that a control electric current does not flow to the coil of the relay 19d. The moving contact of the relay 19u is switched to the ground side, whereby a voltage is not applied to the motor 11. Thus, the rotation of the motor 11 is stopped to stop the window.

In the construction and operation as described above, a signal is outputted to the CPU 14 corresponding to the operation of each of the switches of the operation switch part 13. The CPU 14 controls power supplied through the motor power supply part 12 to the motor 11. The motor 11 is rotated in forward/reverse to open/close the window of an automobile.

Figure 2:
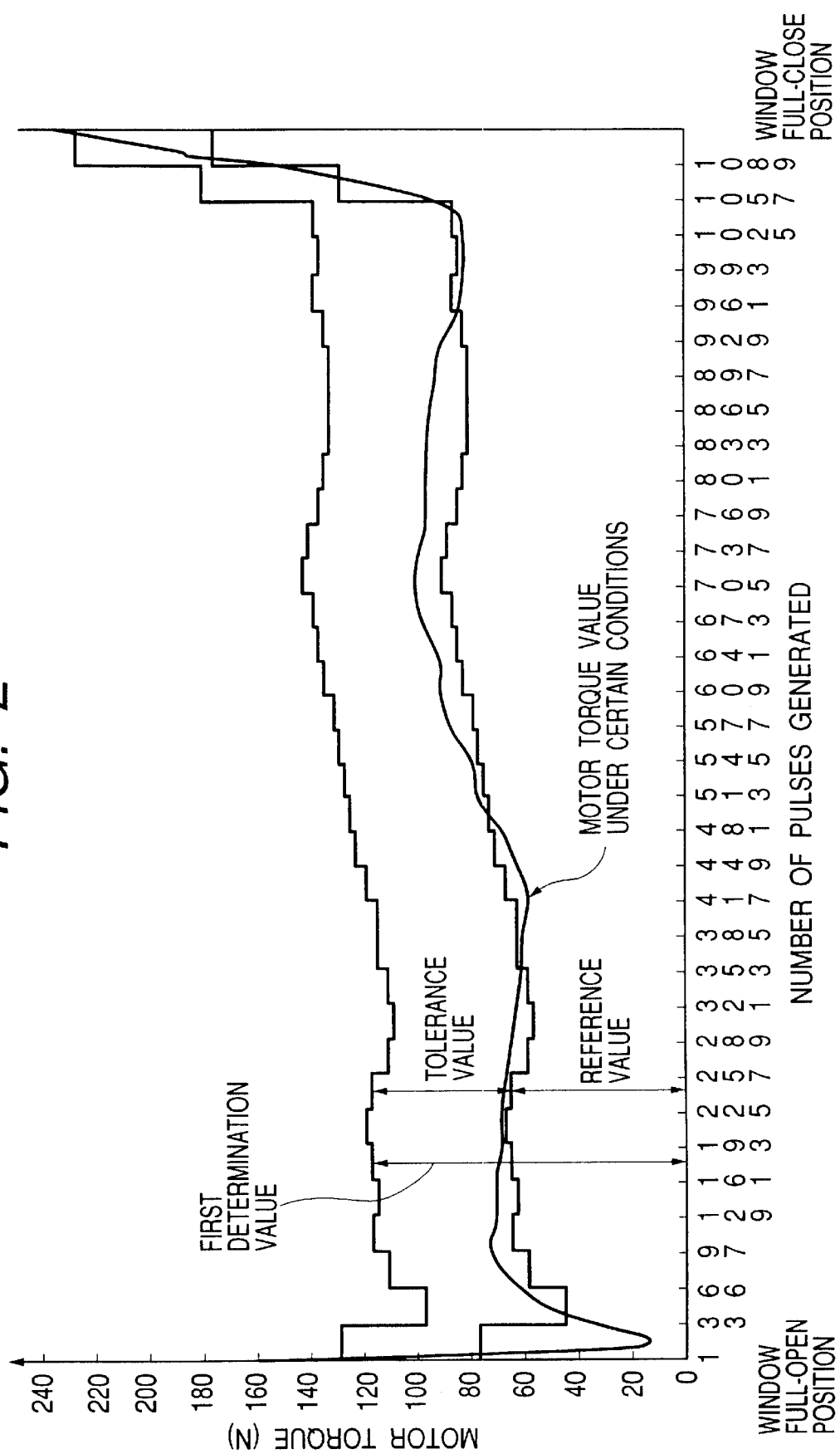
FIG. 2 is a characteristic diagram showing one example of the reference value, the tolerance value and the determination value for each block of a plurality of blocks dividing the whole travel region of the window of the power window apparatus of the present invention and the prior art.

In the power window apparatus, when the whole travel region of the window is divided into, e.g., 36 blocks, the number of pulses generated is 32 pulses for each block. The average of the actual measurements of the motor torque values for 32 pulses under the reference conditions (such as temperature and aging) is a reference value of the motor torque value in the block. A predetermined tolerance value tolerating a fluctuation in the motor torque value and a determination value obtained by adding the reference value and the tolerance value for determining pinching are calculated for each block. FIG. 2 shows one example thereof. The vertical axis show the torque value (N) outputted by the motor 11, the horizontal axis shows the number of pulses generated by the pulse generation part 15 (the left end shows the window full-open position, and the right end shows the window full-close position), and the curve shows the actual measurement of the motor torque under certain conditions (such as temperature and aging) The reference value, the tolerance value and the determination value are set previously and stored in the storing part 14b in the CPU 14 by the torque value storing means.

The power window apparatus uses a torque value outputted by the motor 11 when detecting pinching. The torque motor value is obtained by the equation shown in FIG. 6 using a value such as the interval between pulses generated by the pulse generation part 15. The motor torque value includes the weight of the window, and friction between the window and the window frame.

In the construction described above, when the motor 11 is rotated corresponding to the operation of the operation switch part 13, the pulse generation part 15 is interlocked with the rotation of the motor 11, and generates, e.g., one pulse for one rotation of the motor 11, which is then inputted to the input terminal P07 of the CPU 14.

At this time, the CPU 14 measures the time required for the interval between the inputted pulses generated, by the torque value detection means so as to detect a motor torque value by the equation shown in FIG. 6 based on the time measured. The CPU 14 counts the number of the inputted pulses generated, and from the number of the pulses generated, specifies in what block shown in FIG. 2 the window is positioned.

Figure 3:
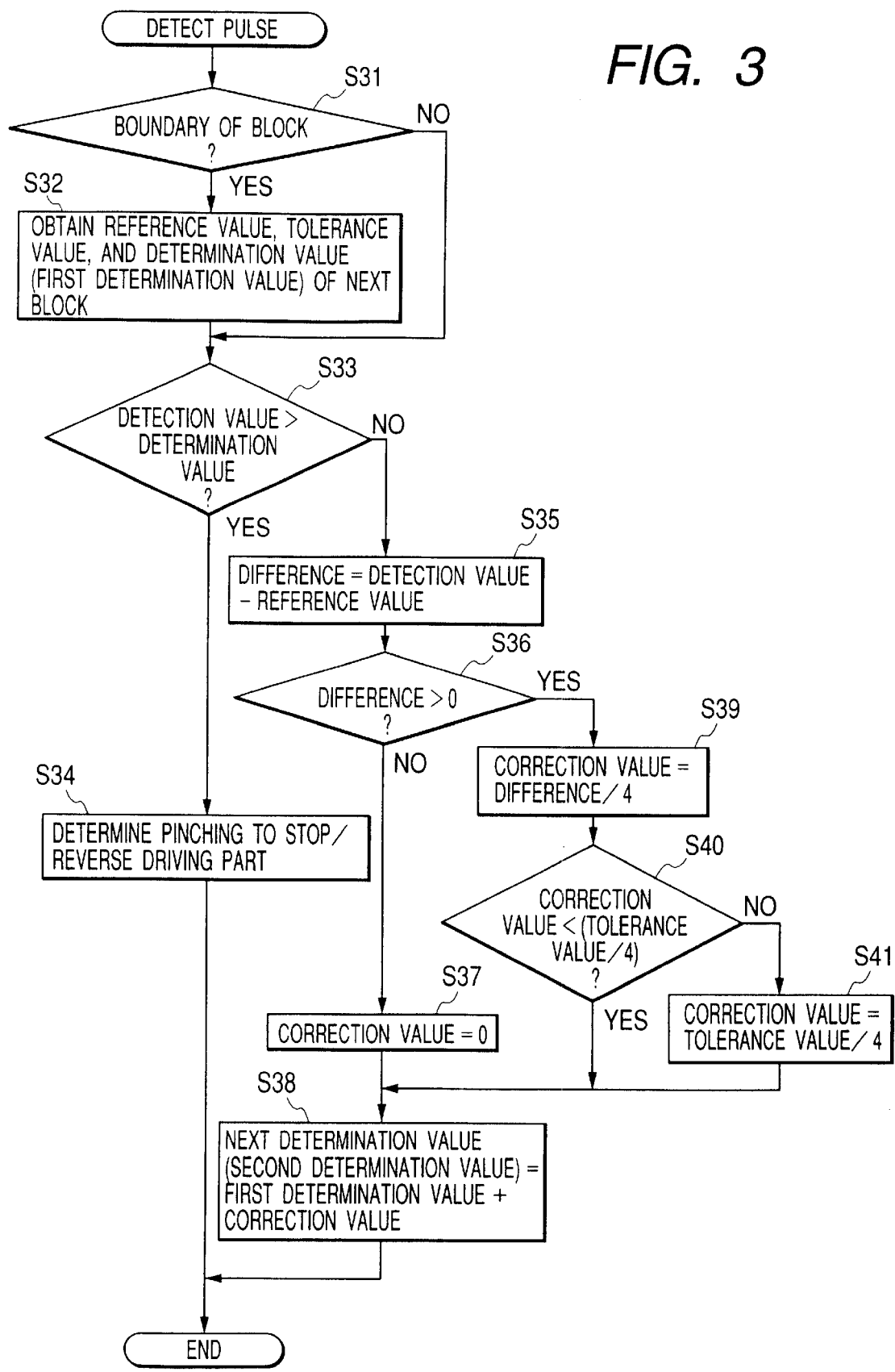
FIG. 3 is a flowchart showing a first embodiment of a method for controlling the power window apparatus of the present invention.
Figure 4:
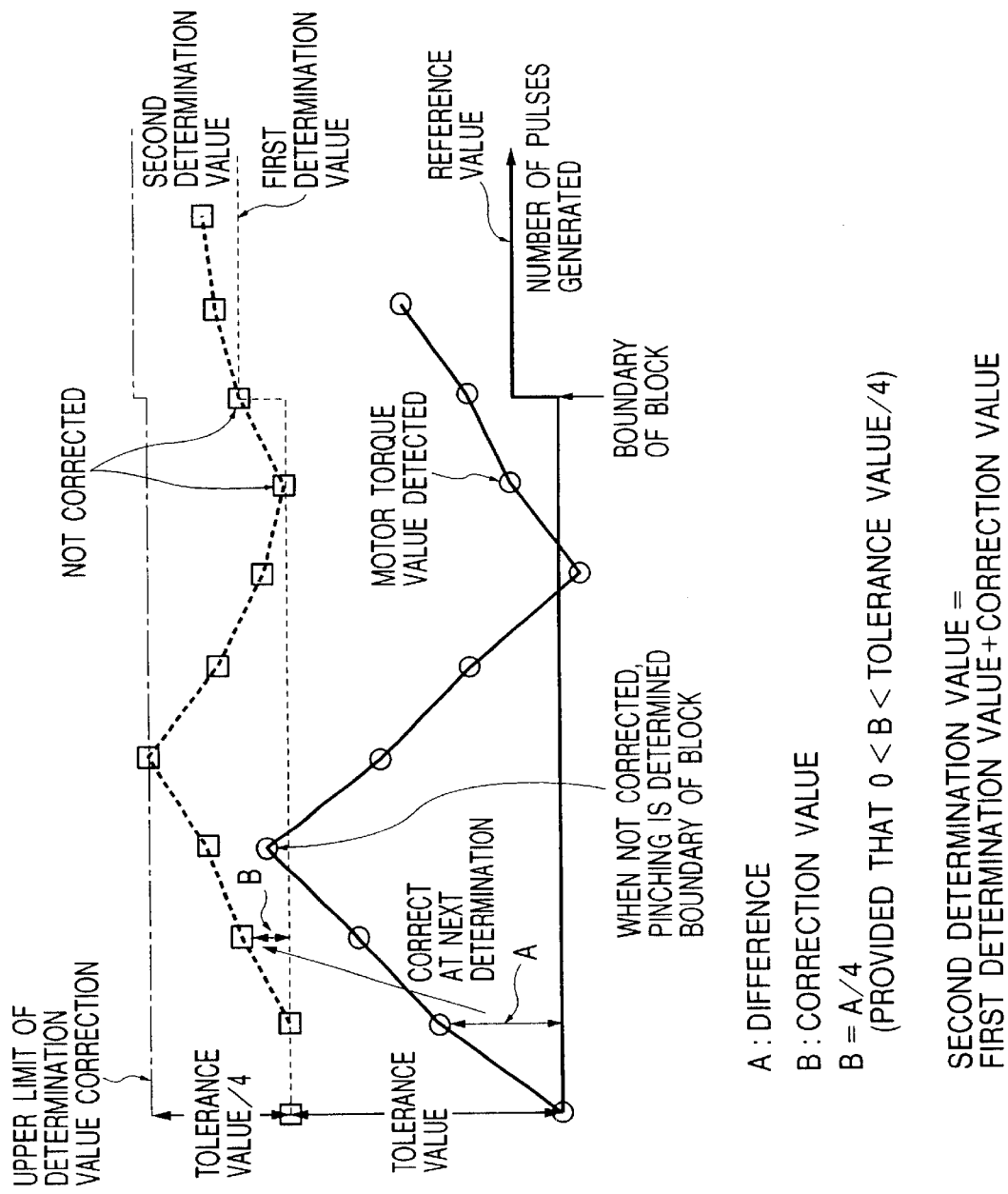
FIG. 4 is a diagram of assistance in explaining a method for determining pinching of the power window apparatus of the present invention.
Figure 5:
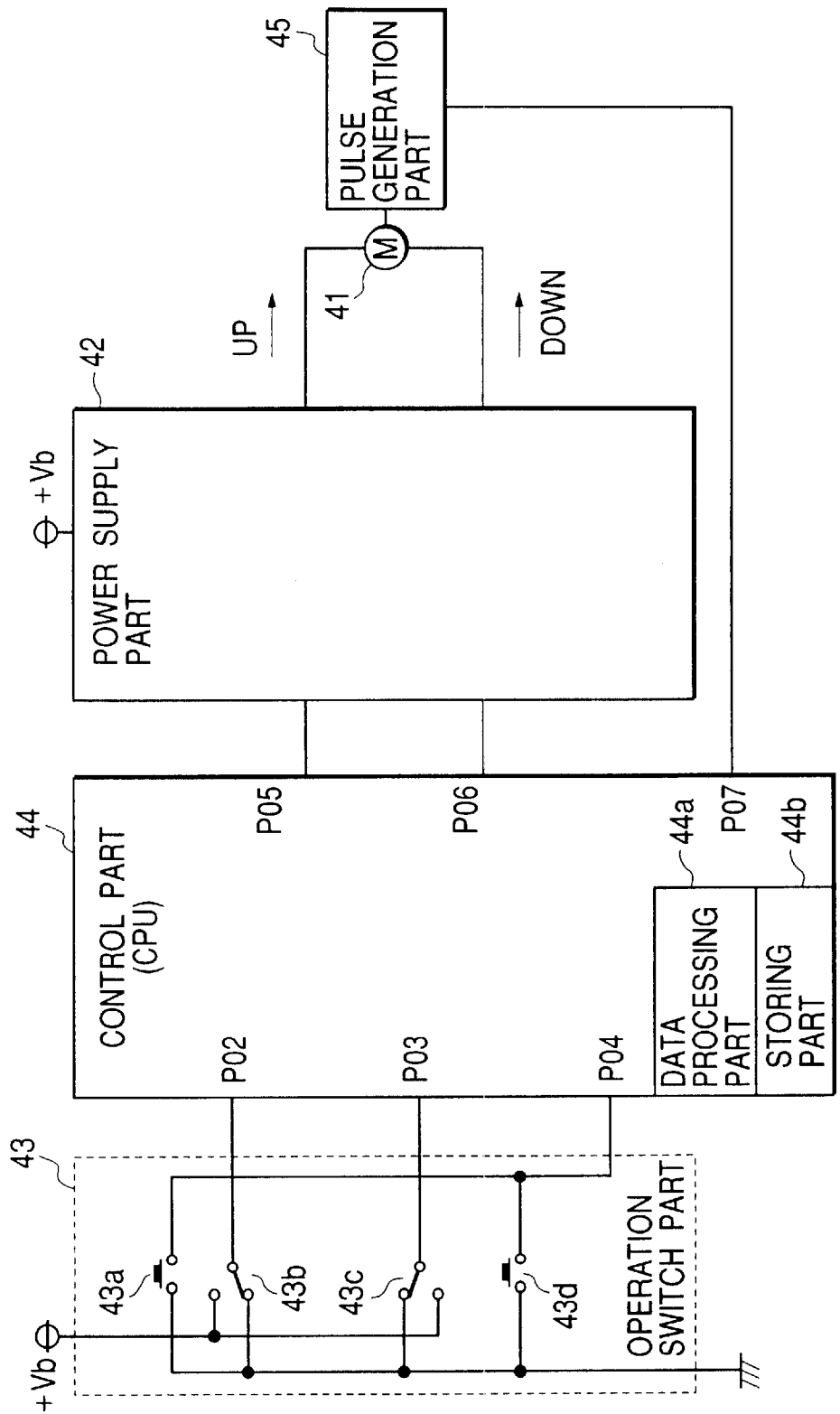
FIG. 5 is a diagram showing the construction of the power window apparatus of the prior art.

FIG. 3 is a flowchart of an embodiment of the method for controlling the power window apparatus. FIG. 4 is a diagram of assistance in explaining a method for determining pinching of the power window apparatus of the present invention. Referring to FIGS. 3 and 4, a procedure for determining pinching by the CPU 14 will be described. In this embodiment, the travel of the window a predetermined distance is done, for example, when the pulse generation part 15 is mechanically mounted on the motor 11 and a pulse from the pulse generation part 15 for generating one pulse for one rotation of the motor 11 is detected.

When the CPU 14 detects the pulse, the motor torque value is detected by the torque value detection means (the circle in FIG. 4), and specifies the block in which the window is positioned, based on the number of pulses generated.

As shown in FIG. 3, whether the pulse is at the boundary of the block or not is determined (S31).

In the case where the pulse is at the boundary of the block (Yes) in step S31, the reference value, the tolerance value and the determination value for the next block set/stored by the torque value storing means are given (S32), and the determination value for pinching (the broken line in FIG. 4) is compared with the motor torque value detected (the circle in FIG. 4) (S33). In the case where the pulse is not at the boundary of the block (No), the routine advances directly to step S33.

In step S33, when the torque value detected (the circle in FIG. 4) is larger (Yes), it is determined that there is pinching to stop or operate the driving part in reverse (S34) for termination. When the determination value is larger (No), it is determined that there is no pinching, and a difference ("A" in FIG. 4) between the torque value detected by the torque value detection means (the circle in FIG. 4) and the reference value (the solid line in FIG. 4) (S35) is calculated, thereby determining whether the difference ("A" in FIG. 4) is positive or negative (S36).

In step S36, when the difference calculated ("A" in FIG. 4) is not positive (No), the correction value ("B" in FIG. 4) is 0 (S37), a value obtained by adding the reference value, the tolerance value and the correction value is the determination value of the next pulse (S38) for termination. When the difference calculated ("A" FIG. 4) is positive (Yes), a value obtained by dividing the difference ("A" FIG. 4) by, e.g., 4 is the correction value ("B" FIG. 4) (S39), and the correction value ("B" FIG. 4) is compared with a value obtained by dividing the tolerance value by, e.g., 4 (S40).

In step S40, when the correction value is smaller than the value by dividing the tolerance value by 4 (Yes), a value obtained by adding the reference value, the tolerance value and the correction value ("B" FIG. 4) is the determination value of the next pulse (the square in FIG. 4) (S38) for termination. When the correction value is larger than the value by dividing the tolerance value by 4 (No), the reference value, the correction value ("B" FIG. 4) is the value obtained by dividing the tolerance value by 4 (S41), and the reference value, the tolerance value and the correction value ("B" FIG. 4) are added to provide the determination value of the next pulse (the square in FIG. 4) (S38) for termination.

From the determining procedure described above, the CPU 14 determines whether there is pinching in the window or not. In the even that there is pinching, the CPU 14 immediately stops or operate the operation of the window in reverse.

In the determining method as described above, when the torque value detected is larger than the reference value, for example, 25% of the difference as the correction value is added to the determination value to perform the next determination. In the event that there occur a fluctuation in the motor torque value or a fluctuation in the coefficient of friction between the window and the window frame due to temperature changes, and an irregular variation in the pulse outputted owing to the shaved gear teeth of the pulse generation part 15 due to changes over time, so that the motor torque value detected is varied each time the pulse is generated, 25% of the variation is added for determination in generating the next pulse. The power window apparatus is less likely to cause malfunction to determine that pinching occurs when the pinching does not occur, thereby stopping or operating the operation of the window in reverse.

The correction value has, e.g., an upper limit of 25% of the difference between the determination value and the reference value. In the event that a soft matter is pinched, the torque is increased gradually, but the determination value is not increased endlessly corresponding to the torque value. When pinching occurs, the pinching can be determined correctly to immediately stop or operate the operation of the window in reverse.

In this embodiment, the reference value, the tolerance value and the correction value are added to provide the determination value of the next pulse generated which is compared with the torque value detected. When the correction value is subtracted from the torque value detected by the next pulse generated, and then, the correction value subtracted is compared with the determination value, the same effect can be given.

The correction value is a value by dividing the difference by, e.g., 4 (25%). It is undesirable that the pinching force at the time of detection of pinching exceeds a maximum of 100N from the torque value detected. For example, suppose that the tolerance value is 70 to 80N typically set. When the tolerance value is 70N, the tolerance value is subtracted from 100N, so that the correction value is a maximum of 30N and is a maximum of 43% of the tolerance value as a percentage. When the tolerance value is 80N, the correction value is a maximum of 20N and is a maximum of 25% of the tolerance value as a percentage. In other words, the correction value may be a value of a maximum of 25 to 43%. In particular, in the case where the difference is divided by 4 (25%), it is a preferable value for the correction value since addition of the correction value to the tolerance value will not exceed 100N. The correction value, which can be calculated by 2-bit shift in the data processing part 14a of the CPU 14, becomes a value capable of being processed fast. The CPU 14 can calculate the correction value fast or an inexpensive CPU which has poor calculation performance can be used.

The upper limit of the correction value is a value (25%) by dividing the tolerance value by 4, the same effect can be given by the same reason as described above.

As described above, according to the present invention, a power window apparatus comprises a driving part for opening and closing the window of an automobile, a pulse generation part for generating a pulse corresponding to the operation of the driving part, torque value detection means for detecting a torque value during intervals between the pulses generated outputted by the driving part, torque value storing means for storing a reference value of torque and a first determination value larger than the reference value for each block of a plurality of blocks dividing the whole travel range of the window, and a control part for comparing the torque value in generating the pulse with a first determination value of the block in which the window is positioned at that time each time the pulse is generated, so as to determine pinching when the torque value is larger than the first determination value and to stop or operate the driving part in reverse, wherein the control part, only when the torque value in generating the pulse is larger than a reference value of the block in which the window is positioned, adds a correction value in proportion to a difference between the torque value and the reference value to the first determination value so as to provide a second determination value, thereby, at the time of generation of the next pulse, determining pinching when the torque value in generating the pulse is larger than the second determination value. Thus, when the motor torque value detected is varied due to temperature changes or changes over time, 25% of the variation is added at the time of the next determination. The power window apparatus can be less likely to cause malfunction to determine that pinching occurs when the pinching does not occur, thereby stopping or reversing the operation of the window.

According to the present invention, the correction value does not exceed a predetermined value. Thus, when the torque value detected is increased gradually, the determination value is not increased endlessly. When pinching occurs, the pinching can be determined correctly.

According to the present invention, the correction value is 25% of the difference, and the predetermined value is 25% of a difference between the first determination value and the reference value of the block in which the window is positioned. The control part facilitates calculation easily so as to perform calculation fast, or it is possible to use the control part which is inexpensive although the calculation performance is poor.

What is claimed is:

1. A power window apparatus comprising:
    a driving part for opening and closing the window of an automobile;
    a pulse generation part for generating a pulse corresponding to the operation of the driving part;
    torque value detection means for detecting a torque value outputted by the driving part;
    torque value storing means for storing a reference value of torque and a first determination value larger than the reference value for each block of a plurality of blocks dividing the whole travel range of the window; and
    a control part for comparing the torque value detected during the operation of the driving part with a first determination value of the block in which the window is positioned at that time each time the pulse is generated, so as to determine pinching when the torque value is larger than the first determination value and to stop or operate the driving part in reverse,
    wherein the control part, only when the torque value is larger than a reference value of the block in which the window is positioned, adds a correction value in proportion to a difference between the torque value and the reference value to the first determination value so as to provide a second determination value, thereby, at the time of the next detection of the torque value, determining pinching when the torque value is larger than the second determination value.

2. The power window apparatus according to claim 1, wherein the correction value does not exceed a predetermined value.

3. The power window apparatus according to claim 2, wherein the correction value is 25% of the difference, and the predetermined value is 25% of a difference between the first determination value and the reference value of the block.

4. A method for controlling a power window apparatus comprising the steps of:
    storing a reference value of torque outputted by a driving part for opening and closing the window and a first determination value larger than the reference value for each block of a plurality of blocks dividing the whole travel range of the window of an automobile;
    detecting a torque value each time the window travels a predetermined distance in the block;
    comparing the torque value with a first determination value of the block in which the window is positioned at that time;
    determining pinching when the torque value is larger than the first determination value; and
    outputting a control signal for stopping or operating the window in reverse,
    the method further comprising the steps of:
        obtaining a difference between the torque value and the reference value of the block in which the window is positioned; and
        adding a correction value in proportion to the difference to the first determination value of the block in which the window is positioned only when the difference is positive to obtain a second determination value, thereby, at the time of the next detection of the torque value, determining pinching when the torque value is larger than the second determination value.

5. The method for controlling a power window apparatus according to claim 4, wherein the correction value does not exceed a predetermined value.

6. The method for controlling a power window apparatus according to claim 5, wherein the correction value is 25% of the difference, and the predetermined value is 25% of a difference between the determination value and the reference value of the block in which the window is positioned.

* * * * *